United States Patent [19]

Daniele

[11] 4,424,524

[45] Jan. 3, 1984

[54] READ/WRITE BAR FOR MULTI-MODE REPRODUCTION MACHINE

[75] Inventor: Joseph J. Daniele, Pittsford, N.Y.

[73] Assignee: Xerox Corporation, Stamford, Conn.

[21] Appl. No.: 394,758

[22] Filed: Jul. 2, 1982

[51] Int. Cl.³ .................. G01D 15/06; H04N 1/04
[52] U.S. Cl. ........................ 346/160; 346/107 R; 358/286
[58] Field of Search ............ 346/160, 107 R; 354/5, 354/12; 358/286, 300

[56] References Cited

U.S. PATENT DOCUMENTS

| | | | |
|---|---|---|---|
| 3,850,517 | 11/1974 | Stephany et al. | 354/12 |
| 4,202,000 | 5/1980 | Carballes | 357/19 |
| 4,217,597 | 8/1980 | Hirtz | 357/19 |
| 4,317,137 | 2/1982 | Tompkins | 358/286 |

*Primary Examiner*—Thomas H. Tarcza
*Attorney, Agent, or Firm*—Frederick E. McMullen

[57] ABSTRACT

A multi-mode reproduction machine or copier incorporating a full width read/write bar having at least one linear array of LEDs for selectively scanning a document original in a read mode or exposing the copier photoreceptor in a write mode. An array of lens elements is provided for focusing the LED array on both the document original and the photoreceptor, the read/write bar and lens array being combined in a unitary structure selectively movable between read and write positions.

In an alternate embodiment the read/write bar and lens array is disposed in a fixed position to permit selective reading of the image developed on the photoreceptor or writing of images onto the photoreceptor.

13 Claims, 6 Drawing Figures

READ/WRITE BAR FOR MULTI-MODE REPRODUCTION MACHINE

The invention relates to a multi-mode reproduction machine, and more particularly to a full width image read/write bar for use in machines of this type.

Typical reproduction machines such as xerographic type copiers may be classified as single mode machines in that machines of this type commonly have just one function, namely to produce copies from document originals. And, while machines of this type may come in a variety of designs, operate at various speeds, and incorporate various and sundry aids such as document handlers, they remain a single mode machine.

Recently, interest has arisen in multi-mode machines, namely, reproduction machines or copiers that in addition to or in lieu of performing the usual copying function also are capable of reading a document image and converting the image to electrical signals or pixels, which then may be stored in memory, transmitted to a remote site via a suitable data communication channel, etc. And as a further supplemental or alternate mode, capable of writing images on the machine imaging member in accordance with an image signal or pixel input from a suitable source which may as in the case of the reading mode discussed above, comprise a memory, data communication channel, etc. However, attempts to provide machines combining one or both of these additional operating functions or modes have been handicapped by problems of greatly increased expense and complexity, problems which have mitigated against the commercial acceptance of machines of this type. For example, one type of image writing system requires a high intensity beam of light which normally requires the use of a relatively expensive laser. But further, a relatively sophisticated optical sustem is needed; an optical system which requires in addition to the usual lenses and mirrors, a device such as a rotating polygon to scan the light beam across the machine imaging element and a modulator such as an acousto-optical type modulator to modulate the beam in accordance with the content of the image signal or pixel input. Coupled with this is the need for complex and expensive electronic circuitry for operating the writing mechanism in timed synchronization with the reproduction machine or copier with which it is associated which often requires the use of large amounts of relatively expensive memory.

The invention seeks to provide a simpler, less expensive multi-mode apparatus capable of reading a document original and converting the image to electrical signals or pixels, or of writing image copies in response to an image signal input, comprising in combination: a viewing station where document originals may be read and converted to electrical signals or pixels; an imaging member on which an image may be written in accordance with an image signal input; a generally rectangular substrate, the length of the substrate being sufficient to permit the substrate to span across the apparatus viewing station and imaging member; plural combination light emitting and light sensing scanning elements on the substrate, the scanning elements being arranged on the substrate so as to provide at least one linear array of scanning elements along the length of the substrate for either scanning a document original at the apparatus viewing station when reading images or scanning the apparatus imaging member when writing images, the lengthwise dimension of the array of scanning elements being at least equal to the corresponding dimension of the apparatus viewing station and the apparatus imaging member; and control means permitting selective actuation of the elements to either read a document original at the apparatus viewing station or write images on the apparatus imaging member.

IN THE DRAWINGS

Figure 1:
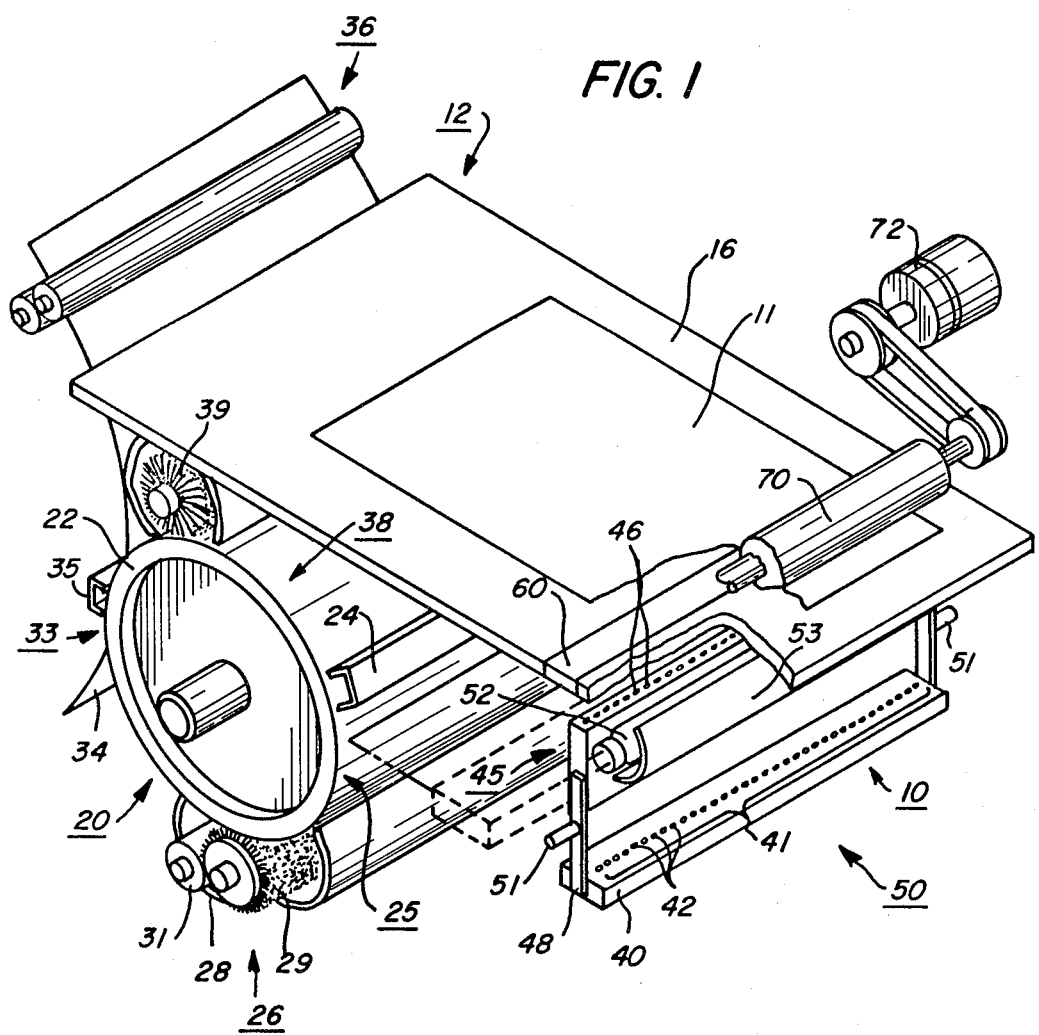
FIG. 1 is an isometric view of a multi-mode reproduction machine incorporating the read/write bar of the present invention.
Figure 2:
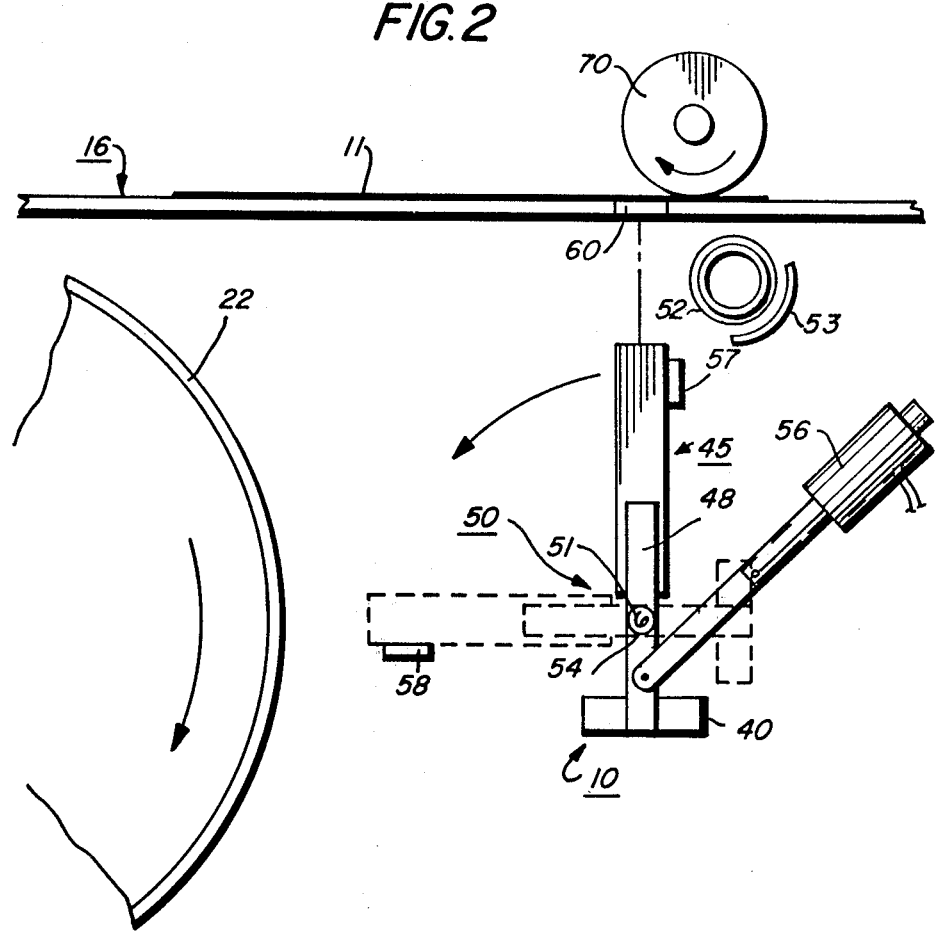
FIG. 2 is a plan view showing details of the multi-mode reproduction machine of FIG. 1.

Referring to FIGS. 1 and 2, the dual function image read/write bar of the present invention, designated generally by the numeral 10, is thereshown in combination with a multi-mode copier or reproduction machine 12. As will appear, reproduction machine 12 is operable in a READ mode to scan a document original 11 disposed on viewing platen 16 and convert the document image to electrical signals or pixels, in a WRITE mode to expose imaging member 20 thereof in accordance with an image signal input to create image copies or reproductions. Reproduction machine 12 is a xerographic based system in which the imaging member 20 comprises a photoreceptor 22 in the form of a drum supported for rotation in a suitable housing or enclosure (not shown). A suitable motor (not shown) rotates drum 22 in the direction shown by the solid line arrow during operation of reproduction machine 12. A suitable corona charging device or corotron 24 is disposed in operative relationship with photoreceptor 22, corotron 24 serving to place a uniform electrostatic charge on photoreceptor drum 22 preparatory to exposure thereof.

Photoreceptor 22 is exposed at an exposure station 25 downstream of corotron 24 in a manner to be more fully described hereinbelow, such exposure creating a latent electrostatic image on the surface of photoreceptor 22. Following exposure, the latent electrostatic image on photoreceptor 22 is developed by a suitable developer 26 illustrated herein as a magnetic brush developing roll 27. Magnetic brush developing roll 27 is rotatably disposed at a suitable developer housing 28, the lower portion of which forms a sump or reservoir 29 for a supply of developer material. A suitable developer loading device illustrated herein as a donor roll 31 serves to draw developer from sump 29 and load the same onto developing roll 27, the magnetic forces generated by suitable magnets internal of developing roll 27 (not shown) serving to attract and hold at least a portion of the developer material on the exterior surface of developing roll 27. As will be understood by those skilled in the xerographic arts, developer material may comprise a mixture of relatively large carrier beads and relatively smaller toner or ink particles, the toner adhering to and being carried on the relatively larger carrier beads through electrostatic forces. On disposition of developer material into operative relationship with photoreceptor 22, toner is attracted to the latent electrostatic image on the photoreceptor from developing roll 27 in proportion to the electrostatic forces to render the latent electrostatic image on photoreceptor 22 visible.

Following development of the latent electrostatic image, the developed image is carried by photoreceptor 22 to transfer station 33 whereat the developed image is transferred from photoreceptor 22 to a suitable copy substrate material shown here as a sheet 34 of copy paper brought forward by a suitable copy sheet feeder 36 in timed relation to arrival of the developed image on photoreceptor 22 at transfer station 33. To facilitate transfer, a transfer corotron 35 is disposed opposite the photoreceptor at transfer station 33. The copy sheet 34 bearing the developed image is carried to a suitable fusing or fixing device (not shown) where the toner image is permanently adhered to the copy sheet 34. A cleaning station 38 downstream of transfer station 33 serves to remove any leftover developing material on the photoreceptor 22 prior to making the next image. In the exemplary copier shown, a cleaning brush 39 is provided at cleaning station 38 for this purpose.

Image read/write bar 10 comprises an elongated generally rectangular base or substrate 40, having an array of individual elements such as Light Emitting Diodes 42 (LEDs herein) arranged in a linear row 41 thereacross. Preferably, the width of substrate 40 in a cross scan direction (the X direction) is such that the length of the row 41 of LEDs 42 is substantially equal to the effective width of the photoreceptor 22. LEDs 42 are preferably integrated into and fabricated with LED control 75 (shown in FIG. 3) on substrate 40 to form a unitary structure, the number of LEDs 42 per increment of length of substrate 40 being determinative of the image resolution achieved.

A linear array lens 45 of gradient optical fibers or fiber lenses 46 is provided, there being one optical fiber 46 for each LED 42 on read/write bar 10. Lens array 45 is disposed in predetermined spaced relationship to the surface of read/write bar 10 and LEDs 42, the optical fibers 46 of lens array 45 being optically aligned with the LEDs 42 associated therewith. Optical fibers of the type referred to herein are produced under the tradename "SELFOC", registered in Japan and owned by Nippon Sheet Glass Co., Ltd. To assure a predetermined spatial relationship between read/write bar 40 and lens array 45, suitable frame elements 48 are used to rigidly couple read/write bar 10 with lens array 45 to form a combined read/write bar-lens array structure 50. To enable the read/write bar-lens array structure 50 to be selectively moved between read and write positions as will appear, the read/write bar-lens array 50 is supported for pivotal movement as by means of pins 51 between photoreceptor 22 and a slit-like document scanning aperture 60 in an adjoining document supporting platen 16. One or more torsion type springs 54 serve to bias the structure 50 to one position (illustrated herein as the image read position). A suitable operator such as solenoid 56 is drivingly coupled to the read/write bar-lens array structure 50, solenoid 56 being operative when energized to rotate the structure 50 through an arc of approximately 90° to place the read/write bar-lens array structure 50 to a second write position. Adjustable stops 57, 58 limit rotation of the structure 50 and permit preadjustment of the position of the structure 50 in proper axial alignment with scan aperture 60 and exposure station 25 for optimum operation in both the read and write modes.

Platen 16 forms a relatively flat or planar surface 64 for supporting the document 11 to be scanned, scanning taking place through the slit-like scanning aperture 60 in platen 16. The longitudinal axis of scanning aperture 60 extends in a direction paralleling the scan axis of read/write bar 10 (i.e. the X direction), the longitudinal dimension of aperture 60 being equal to or slightly greater than the length of the LED row 41 while the dimension of the aperture 60 along the scan axis (the Y direction) is sufficient to permit at least one line of the document to be viewed at a time by read/write bar 10. To illuminate the aperture 60 and the portion of the document 11 thereover, one or more lamps 52 are disposed adjacent the underside of platen 16 and scanning aperture 60 and to one side of the system optical path. Reflectors 53 may be provided to concentrate the light from lamps 52 onto aperture 60.

To advance the document 11 to be scanned across platen 16 and scanning aperture 60, a suitable feeder illustrated herein as a constant velocity transport (CVT) document feed roll 70 is provided. Platen 16 and feed roll 70 cooperate to form a nip between which the document is fed. Document feed roll 70, which is preferably disposed adjacent one edge of aperture 60, is driven by a suitable motor such as step motor 72.

Figure 3:
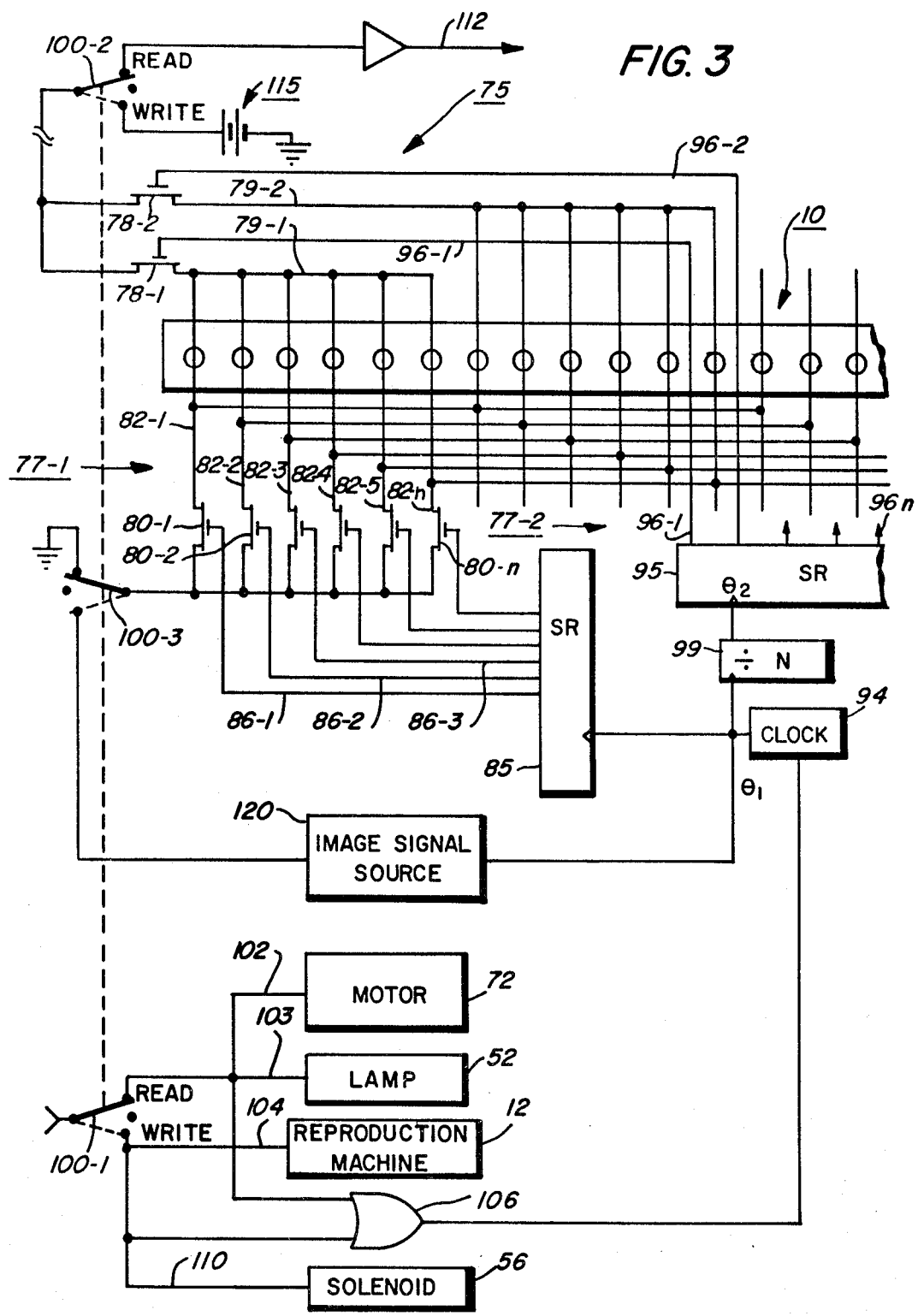
FIG. 3 is a logic schematic of the control system for the multi-mode reproduction machine in FIG. 1.
Figure 4:
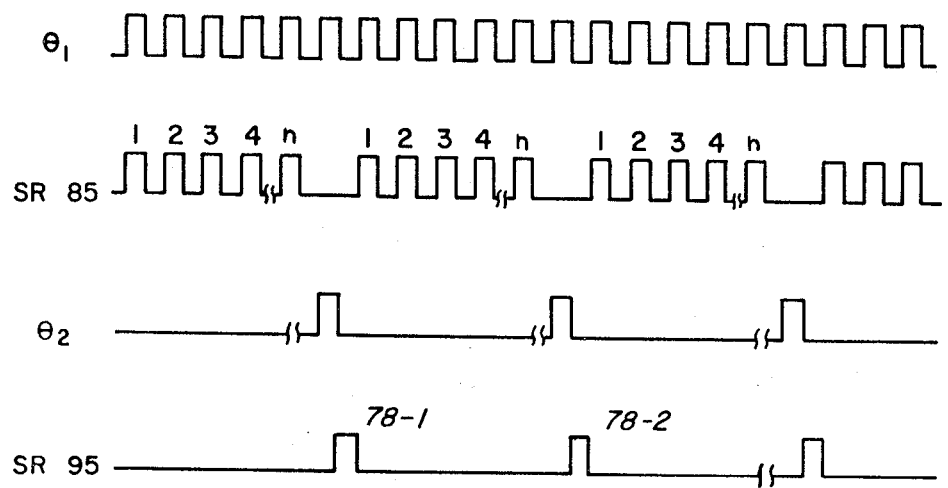
FIG. 4 is a timing diagram illustrating the operating sequences for the read/write bar of FIG. 1.

Referring particularly to FIG. 3, LED control 75 comprises a matrix system for selectively operating LEDs 42 as appropriate to either read the document 11 or write images on photoreceptor 22. Pursuant thereto, LEDs 42 are segregated into groups 77-1, 77-2, ... 77-n of an equal number of LEDs each, with a group control switch 78-1, 78-2, ... 78-n being provided in lines 79-1, 79-2, ... 79-n thereof for enabling selective operation of each individual LED group. LED control switches 80-1, 80-2, ... 80-n are provided, the number of control switches 80-1, 80-2, ... 80-n being equal to the number of LEDs 42 that comprise LED groups 77-1, 77-2, ... 77-n. LED control switches 80-1, 80-2, ... 80-n are coupled to the LEDs 42 of each LED group 77-1, 77-2, ... 77-n through lines 82-1, 82-2, ... 82-n.

An LED control shift register 85, the successive output gates of which are coupled by control lines 86-1, 86-2, ... 86-n to LED control gates 80-1, 80-2, ... 80-n controls actuation of the LED control gates in timed sequence in reponse to clock signals $\theta$ from a clock 94. An LED group control shift register 95 has successive output gates thereof coupled by control lines 96-1, 96-2, ... 96-n to LED group control gates 78-1, 78-2, ... 78-n, control signals output by shift register 95 serving to actuate LED group control gates 78-1, 78-2, ... 78-n in timed succession to enable the individual LED groups 77-1, 77-2, ... 77-n associated therewith. LED group control shift register 95 is driven by clock signals $\theta_2$ which are a fraction of the clock signals $\theta_1$ used to control actuation of the individual LED control gates 82-1, 82-2, ... 82-n. Clock signals $\theta_2$ are derived from clock signals $\theta_1$ through divide by n circuit 99, it being understood that the ratio of clock pulses $\theta_1$ to $\theta_2$ and the setting of divide by n circuit 99 is proportional to the number of LEDs 42 in each LED group 77-1, 77-2, ... 77-n.

A suitable multi-section mode selector, illustrated herein in the form of switch 100, is provided to permit the operator or user to select the operating mode desired, i.e. either READ or WRITE mode. Section 110-1 of selector switch 100 controls energization of document feed motor 72, lamp 52, and reproduction machine 12 through lines 102, 103, 104 respectively, and clock 94 through OR function gate 106. Additionally, selector switch section 100-1 controls operation of solenoid 56 through line 110. Selector switch section 100-2 selectively couples of one side of LED control 75 with either image signal output line 112 or voltage source 115 in response to READ or WRITE mode selection. Selector switch section 100-3 selectively couples the other side of LED control 75 to either ground or a suitable source of video image signals designated herein by the numeral 120. As will be understood by those skilled in the art, image signal output line 112 may be coupled to any suitable image user such as a memory, communication channel, etc. Similarly, image signal source 120 may comprise memory, communication channel, image reader, etc.

Operation

Referring to FIGS. 1–4, where operation in the READ mode is desired, selector switch 100 is set to the solid line position shown in the drawings. In this operational mode, LEDs 42 function as light detectors to output an electrical signal or pixel, the potential of which reflects the grey level of the image portion viewed. In this setting, selector switch section 100-1 enables document feed motor 72 so that on a demand for image signals, the document 11 to be scanned is moved across scanning aperture 60. It is understood that the document 11 to be scanned is previously inserted into the nip formed by document feed roll 70 and platen 16. Lamp 52 is enabled by selector switch section 100-1 to illuminate scanning aperture 60 and the portion of the document 11 thereover during the scanning cycle, and clock 94 is enabled to operate read/write bar 10. Selector switch sections 100-2 and 100-3 couple LED control 75 between image signal output line 112 and ground.

It is understood that the combined read/write bar-lens array structure 50 is normally disposed in the solid line position shown, springs 54 serving to retain the structure 50 against stop 57 so that the row 41 of LEDs 42 on read/write bar 10 are focused by lens array 45 onto the scanning aperture 60 and the document portion thereover.

On demand for image signals following insertion of the document to be scanned into the nip formed by document feed roll 70 and platen 16, clock signals $\theta_1$ from clock 94 operate read/write bar 10 to scan the document 11 line by line as the document is moved past scanning aperture 60 by document feed roll 70, the clock pulses $\theta_1$ driving LED control shift register 85 and LED group control shift register 95 to successively couple the individual LEDs 42 of read/write bar to output line 112, shift register 85 repeatedly actuating in succession the individual LED control switches 80-1, 80-2, ... 80-n while shift register 95 successively enables LED groups 77-1, 77-2, ... 77-n in synchronism therewith to sample each LED 42 in succession across the scan line. The above process is repeated as each line of the document 11 is moved past scanning aperture 60 until scanning of the entire document 11 is completed at which time selector switch 100 may be set to the inoperative or neutral position.

Where it is desired to operate in the WRITE mode, selector switch 100 is moved to the dotted line position. In this operating mode, LEDs 42 function as individually controlled light emitters effective to selectively expose the photoreceptor 22 line by line in accordance with an image signal input. In this position, selector switch section 100-1 enables reproduction machine 12 and clock 94, the latter to operate read/write bar 10 in the manner described heretofore. At the same time switch section 100-1 actuates solenoid 56 to move the read/write bar-lens array structure 50 through an arc of approximately 90° to the dotted line position shown wherein the row 41 of LEDs 42 on read/write bar 10 are focused onto the photoreceptor 22 of reproduction machine 12 at imaging station 25. Selector switch sections 100-2 and 100-3 couple LED control 75 between voltage source 115 and image signal source 120.

On input of video signals from image signal source 120, reproduction machine 12 and read/write bar 10 are actuated, LEDs 42 selectively exposing the charged photoreceptor 22 in accordance with the image signal output of image signal source 120 to form a latent electrostatic image on photoreceptor 22. The image formed on photoreceptor 22 is developed by developer 26 and transferred to the copy sheet 34 at transfer station 33. In this mode, image signals from image signal source 120 are applied in succession to individual LEDs 42 on read/write bar 10 through LED control switches 80-1, 80-2, ... 80-n on an LED group by group basis as determined by LED group control switches 78-1, 78-2, ... 78-n. The selective actuation of individual LEDs 42 in accordance with the image signal content of the image signal output of signal source 120 creates a latent electrostatic image as described on photoreceptor 22.

FIGS. 5 AND 6 EMBODIMENT

Figure 5:
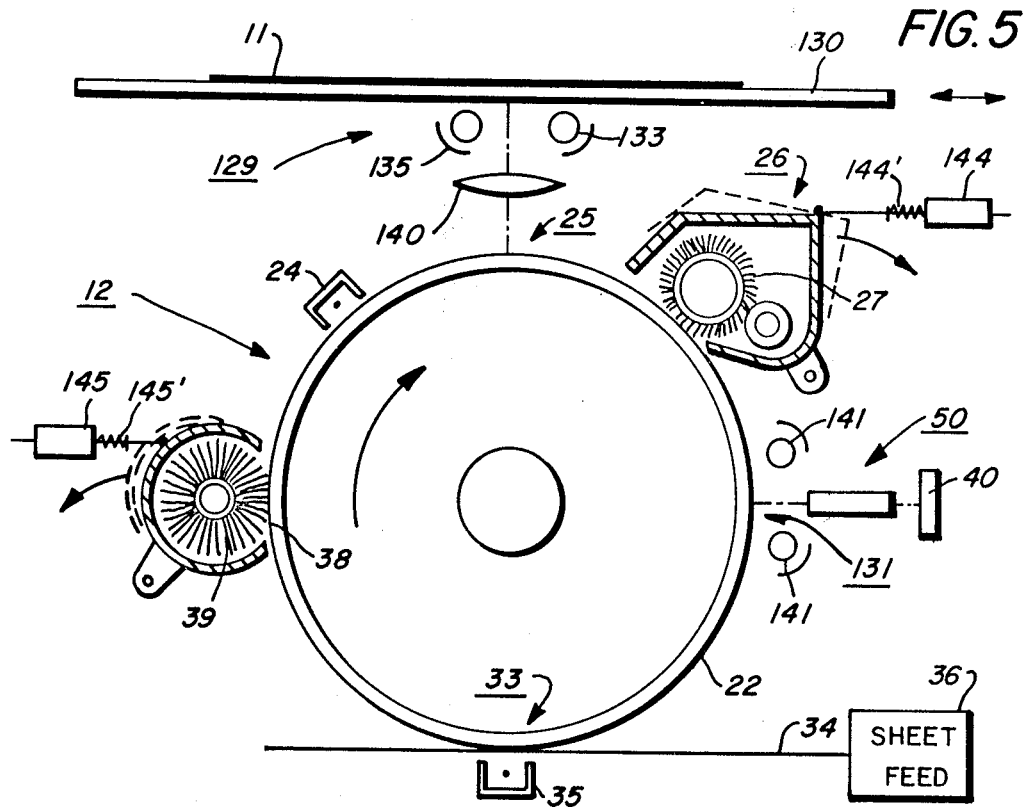
FIG. 5 is a plan view of an alternate multi-mode reproduction machine incorporating the read/write bar of the present invention.
Figure 6:
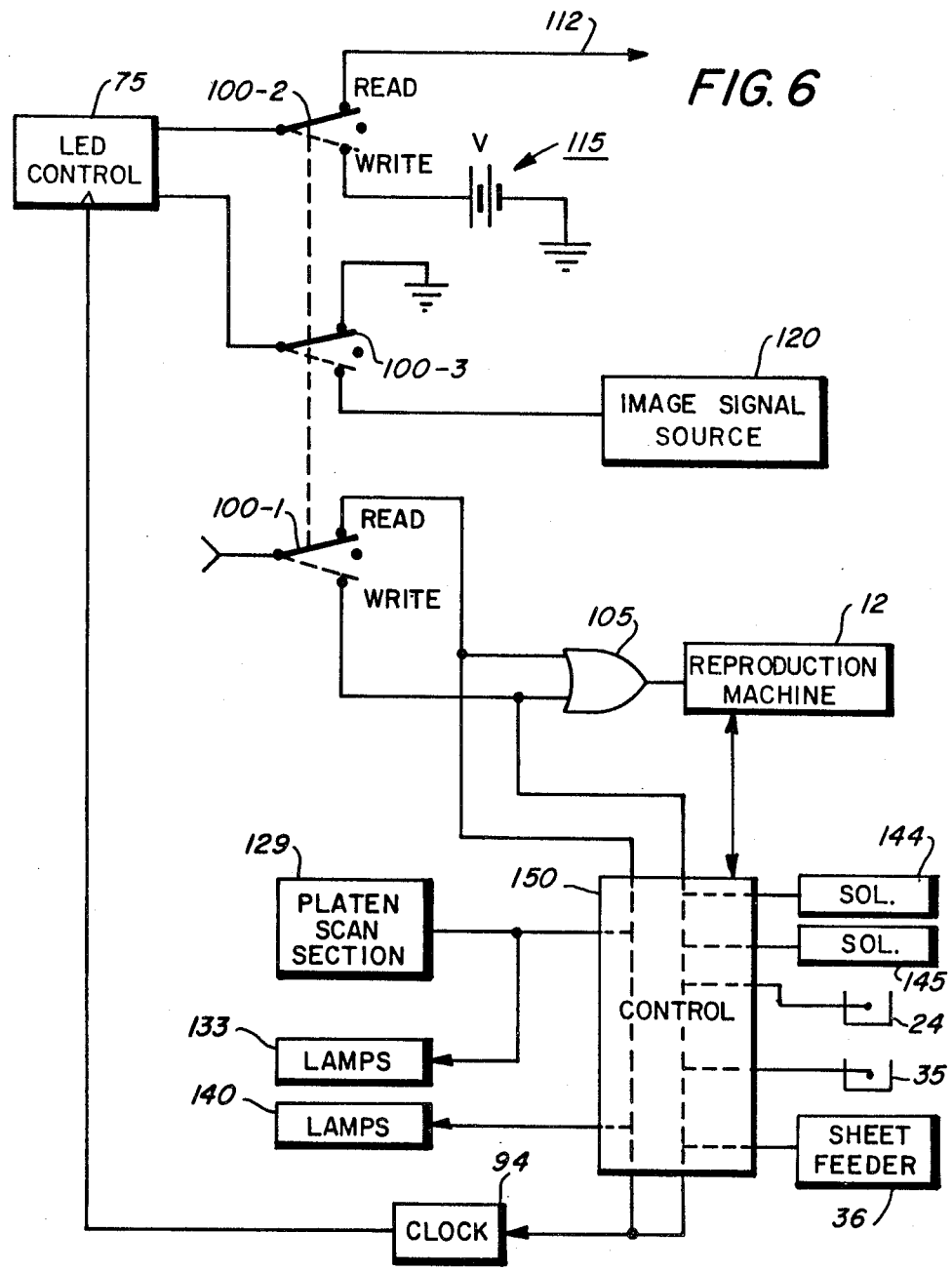
FIG. 6 is a logic schematic of the control system for the multi-mode reproduction machine shown in FIG. 5.

In the embodiment shown in FIGS. 5 and 6, where like numbers refer to like parts, the read/write bar-lens array structure 50 is disposed in fixed position to either read images developed on photoreceptor 22 or write images on photoreceptor 22 at read/write station 131. Accordingly, the pivoted mounting mechanism and solenoid 56 of the previous embodiment are dispensed with.

In this embodiment, reproduction machine 12 includes a document scan section 129 having a transparent platen 130 supported for reciprocating movement in predetermined spaced relation to photoreceptor 22 opposite exposure station 25. A suitable driving mechanism (not shown) is provided for moving platen 130 and the document 11 thereon past exposure station 25. A pair of lamps 133 with cooperating reflectors 135 serve to illuminate a line like portion of the platen 130 and the document 11 resting thereon. A lens 140 focuses the document area illuminated by lamp pair 133 onto the photoreceptor 22 at document exposure station 25.

A pair of image reading lamps 140 are disposed adjacent photoreceptor 22 downstream of developer 26 and adjacent either side of the optical path formed by the lens array 45. Lamps 140 serve when energized to illuminate a line-like portion of photoreceptor 22 and the image developed thereon at read/write station 131 as will appear. To enable the developed image on photoreceptor 22 to pass by developer 26 and cleaning brush 39 unimpeded, developer 26 and cleaning brush 39 are disabled during the WRITE mode. For this purpose, developer 26 and cleaning brush 39 are suitably supported for pivotal movement into and out of operative relation with photoreceptor 22. Solenoids 144, 145 serve upon energization to swing developer and cleaning brush 26, 39, respectively to the inoperative position shown by the dotted lines of FIG. 5. Return springs 144', 145' bias developer 26 and cleaning brush 39 respectively into operative relationship with photoreceptor 22, suitable stops (not shown) being provided to limit movement thereof.

Referring to FIG. 6, selector switch section 100-1 controls enablement of reproduction machine 12 through OR function gate 105 in both the READ and WRITE modes. A suitable controller 150 is provided for controlling actuation of clock 94, platen scan section 129 and lamps 133, 140 during the image READ mode, and disabling of corotrons 24, 35 and sheet feeder 36 and actuation of clock 94 and solenoids 144, 145 during the image WRITE mode as will appear. Control line 106 permits synchronization between controller 150 and reproduction machine 12.

OPERATION OF FIGS. 5 AND 6 EMBODIMENT

In the embodiment of FIGS. 5 and 6, for operation in the READ mode, selector switch 100 is set to the read position as described. In this position, selector switch section 100-1 actuates reproduction machine 12 and controller 150. Controller 150 actuates platen scan section 129 including exposure lamps 133 to scan the document 11 on platen 130. The image rays reflected from the line-like portion of the document illuminated by lamps 133 pass through lens 140 to expose the moving photoreceptor 22 line by line and create a latent electrostatic image of the document 11 on photoreceptor 22. It is understood that photoreceptor 22 is previously charged uniformly by corotron 24 in preparation for imaging.

The latent electrostatic image created on photoreceptor 22 is thereafter developed by developer 26. As the developed image moves through read/write station 131, read/write bar 10 is operated to scan photoreceptor 22 and the developed image thereon. Concurrently, lamps 140 are actuated to illuminate the photoreceptor and the developed image at read/write station 131. Light striking photoreceptor 22 and the developed image is scattered and reflected by the uncovered portions of photoreceptor 22 while in the areas of photoreceptor 22 covered by toner, the light is absorbed. The reflected light is collected by lens array 45 and focused onto the row 41 of LEDs 42 of read/write bar 10 where the reflected light is converted to image signals or pixels as the individual LEDs are sampled in succession by LED control 75 in the manner described heretofore. The resulting image signals are output to line 112 and the user. The developed image, after read/write station 131 is transferred to the sheet of copy paper 34 brought forward by sheet feeder 36 at transfer station 33. Photoreceptor 22 is thereafter cleaned at cleaning station 38 by cleaning brush 39 in the manner described heretofore. Alternately, transfer may be dispensed with and the developed image removed in its entirety from the photoreceptor 22 by cleaning brush 39.

For operation in the WRITE mode, selector 100 is set to the write position, selector section 100-1 energizing reproduction machine 12 and controller 150. Selector switch sections 100-2 and 100-3 couple LED control 75 between voltage source 115 and image signal source 120 in the manner described heretofore.

In this operational mode, two rotational cycles of photoreceptor 22 (using a point between cleaning station 38 and corotron 24 as a reference) occur for each copy produced. During the first rotational cycle of photoreceptor 22, photoreceptor 22 is charged by corotron 24 and exposed at read/write station 131 by read/write bar 10 while developer 26, transfer corotron 35, sheet feeder 36, and cleaning brush 39 are held inactive.

For this purpose, controller 150 actuates solenoids 144, 145 to move developer 26 and cleaning brush 39 out of operative relationship with photoreceptor 22 and disables transfer corotron 35 and copy sheet feeder 36.

During the second rotational cycle of photoreceptor 22, the latent electrostatic image on photoreceptor 22 is developed by developer 26, transferred to a copy sheet 34 at transfer station 33 and the photoreceptor cleaned by brush 39 while corotron 24 and read/write bar 10 are inactive. During this cycle, controller 150 inactivates solenoids 144, 145 to return developer 26 and cleaning brush 39 into operative relationship with photoreceptor 22, and enables transfer corotron 35 and sheet feeder 36 to provide a copy sheet 34 at transfer station 33 in registered relation with the developed image on photoreceptor 22.

During the first rotational cycle, as the previously charged photoreceptor 22 moves through read/write station 131, the row 41 of LEDs 42 of read/write bar 10 are selectively energized in response to the image signal output of image signal source 120 to expose photoreceptor 22 line by line and create a latent electrostatic image thereon. The latent electrostatic image is carried past the now-inactivated transfer and cleaning stations 33, 38 respectively and corotron 24 to developer 26 where the image is developed. The developed image is thereafter carried through read/write station 131 (read/write bar 10 is inoperative at this point) to transfer station 33 where the developed image is transferred to the copy sheet 34 brought forward by sheet feeder 36. Following transfer, photoreceptor 22 is cleaned by cleaning brush 39.

While dual mode (i.e. READ/WRITE) operation of the reproduction machine 12 shown in the FIGS. 5 and 6 embodiment is discussed, it will be understood that reproduction machine 12 may additionally be operated independently in a third or copy mode in a manner typical of xerographic copiers. In that mode, read/write bar 10 would not be used. Instead, the document 10 to be copied would be placed on platen 130, platen scan section 129 actuated in conjunction with operation of reproduction machine 12 to scan the document and create a latent electrostatic image of the document on the previously charged photoreceptor 22. The latent image on photoreceptor 22 is thereafter developed by developer 26 and transferred to copy sheet 34 at transfer station 33. Following transfer, photoreceptor 22 is cleaned at cleaning station 38.

While the invention has been described with reference to the structure disclosed, it is not confined to the details set forth, but is intended to cover such modifications or changes as may come within the scope of the following claims.

I claim:

1. Combined image reading and writing means for either scanning a document original to provide image signals representative of the document image or scanning an imaging member and exposing said imaging member in accordance with an image signal input to write images represented by said image signal input on said imaging member comprising in combination:
   (a) a substrate;
   (b) plural combination light emitting and light sensing scanning elements on said substrate, said scanning elements being arranged on said substrate in at least one linear array capable of either scanning a document original or scanning said imaging member; and (c) control means for operating said elements as either image sensors for converting the image content of said document original to image signals or as selectively actuable light emitters for exposing said imaging member in accordance with said image signal input.

2. The combined image reading and writing means according to claim 1 in which said scanning elements comprise light emitting diodes.

3. The combined image reading and writing means according to claim 1 in which the length of said array of scanning elements is at least equal to the effective width of said imaging member.

4. Combined image reading and writing means for use with raster scanning apparatus of the type having a viewing station where a document original may be read and converted to electrical signals, and an imaging member on which an image may be written in response to image signals, comprising in combination:

(a) a generally rectangular substrate, the length of said substrate being sufficient to permit said substrate to span across said apparatus viewing station and imaging member;

(b) plural combination light emitting and light sensing scanning elements on said substrate, said scanning elements being arranged on said substrate so as to provide at least one linear array of said scanning elements along the length of said substrate for either scanning a document original at said apparatus viewing station when reading images or scanning said apparatus imaging member when writing images, the lengthwise dimension of said array of scanning elements being at least equal to the corresponding dimension of said apparatus viewing station and said apparatus imaging member; and (c) control means permitting selective actuation of said elements to either read a document original at said apparatus viewing station or write images on said apparatus imaging member.

5. The image reading and writing means according to claim 4 in which said control means includes matrix switching means for actuating said elements individually.

6. The image reading and writing means according to claim 5 in which said scanning elements are arranged in M groups of N scanning elements each, said matrix switching means having N first switches for controlling actuation of individual scanning elements, and M second switches for controlling actuation of said M groups individually.

7. The image reading and writing means according to claim 4 in which said scanning elements comprise light emitting diodes.

8. A full width image reading and writing array comprising:

(a) a generally rectangular base member;
(b) plural light emitting diodes on said base member arranged to form at least one line of light emitting diodes, the length of said line of light emitting diodes being at least equal to the width of the maximum image to be processed; and
(c) switch means for selectively operating said light emitting diodes individually to either cause said light emitting diodes to act as light detectors whereby to read an image original and convert the image read to electrical signals or to cause said light emitting diodes to act as light sources whereby to write images on an imaging member in response to an image signal input.

9. A multi-mode apparatus capable of reading a document original and converting the document original to image signals or of writing image copies in response to an image signal input, comprising in combination:

(a) a platen for supporting document originals to be read;
(b) an imaging member on which image copies may be formed in response to an image signal input;
(c) means for developing images formed on said imaging member to render said images visible;
(d) a combination image read/write bar having plural dual function image read and write elements, said image read and write elements being arranged in at least one longitudinally extending row to provide a substantially full width scanning array enabling scanning of an entire line at once; and
(e) means for controlling operation of said image read and write elements to either read document originals on said platen or to write images on said imaging member in response to said image signal input.

10. The apparatus according to claim 9 including a lens array for focusing said image read and write elements on said platen and said imaging member, said lens array comprising a plurality of lens means arranged in at least one linear array, the number of said individual lens means being equal to the number of said image read and write elements whereby there is provided a lens means for each of said image read and write elements; and means for locating said lens array in predetermined operative relation with said image read and write elements.

11. The apparatus according to claim 10 including means supporting said read/write bar and said lens array for movement between a read position where said image read and write elements scan said platen and the document original thereon and a write position where said image read and write elements scan said imaging member, said controlling means being adapted to move said read/write bar and said lens array to either said read position or said write position in response to a demand for image signals or a demand for image copies.

12. A multi-mode apparatus capable of reading a document original and converting the document original to image signals or of writing image copies in response to an image signal input, comprising in combination:

(a) a platen for supporting document originals to be read;
(b) an imaging member on which image copies may be formed in response to an image signal input;
(c) means for developing images formed on said imaging member to render said images visible;
(d) a combination image read/write bar having plural dual function image read and write elements, said image read and write elements being arranged in at least one longitudinally extending row to provide a substantially full width scanning array enabling scanning of an entire line at once; and
(e) means for controlling operation of said image read and write elements to either read the images developed on said imaging member or to write images on said imaging member in response to said image signal input.

13. The apparatus according to claim 12 including a lens array for focusing said image read and write elements on said imaging member, said lens array comprising a plurality of lens means arranged in at least one linear array, the number of said individual lens means being equal to the number of said image read and write elements whereby there is provided a lens means for each of said image read and write elements;

means for locating said lens array in predetermined operative relation with said image read and write elements.

* * * * *